Oct. 31, 1967
A. F. SWANSON
3,350,499
INSULATED CONNECTOR
Filed Sept. 27, 1966
3 Sheets-Sheet 1
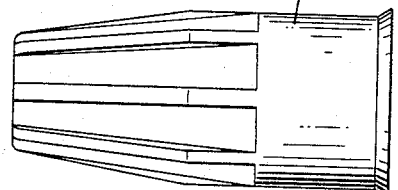
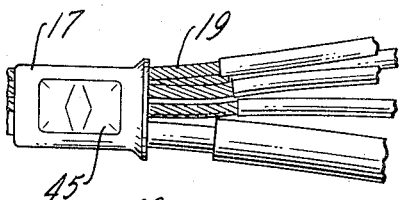
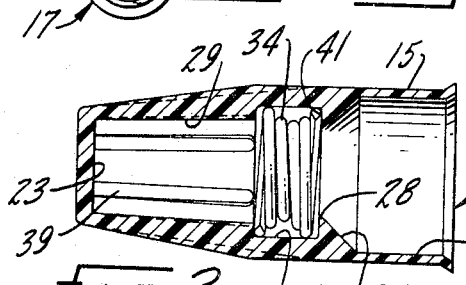
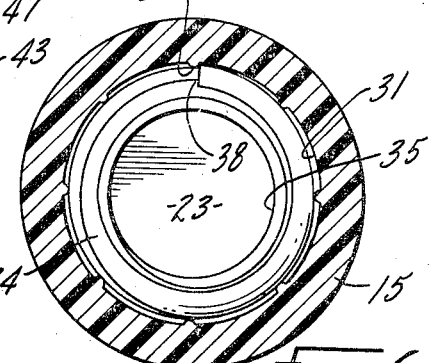
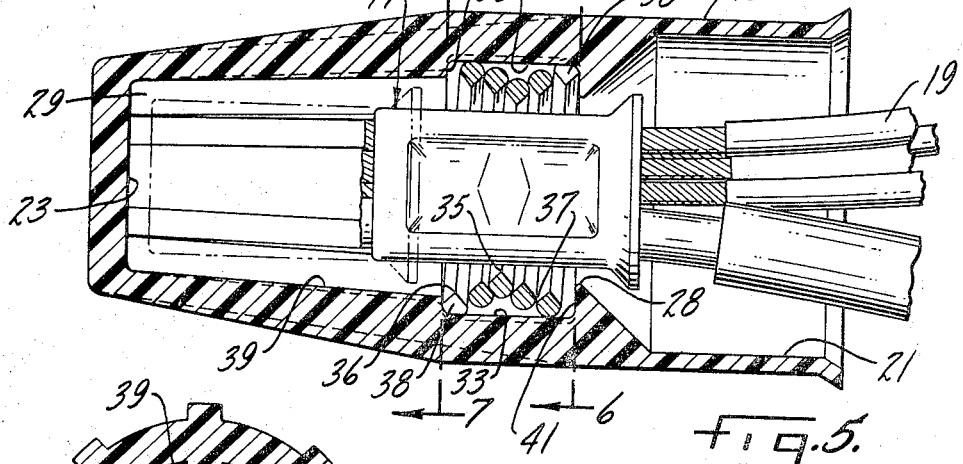
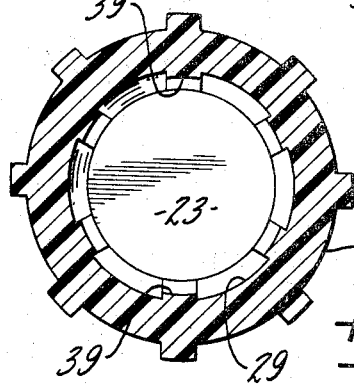
INVENTOR.
Arthur F. Swanson,
BY Parker & Carter
Attorneys.

Oct. 31, 1967  A. F. SWANSON  3,350,499
INSULATED CONNECTOR
Filed Sept. 27, 1966  3 Sheets-Sheet 2
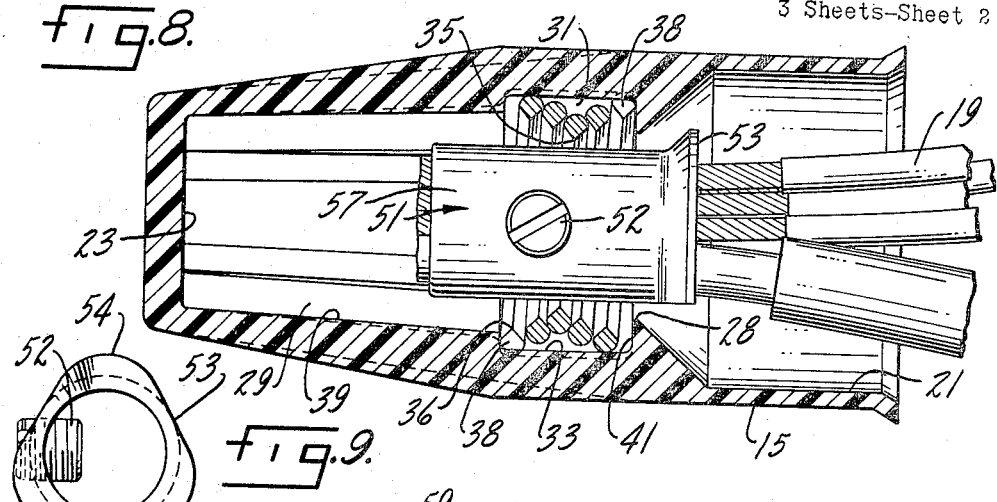
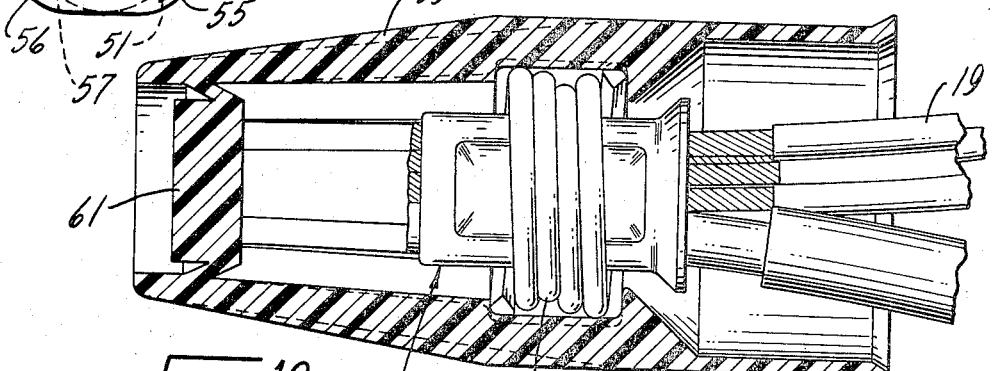
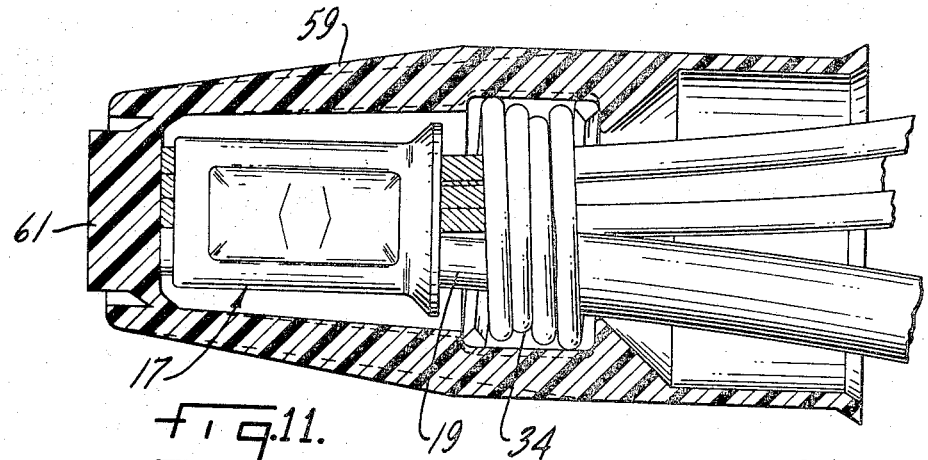
INVENTOR.
Arthur F. Swanson,
BY Parker & Carter
Attorneys.

Oct. 31, 1967  A. F. SWANSON  3,350,499
INSULATED CONNECTOR
Filed Sept. 27, 1966
3 Sheets-Sheet 3
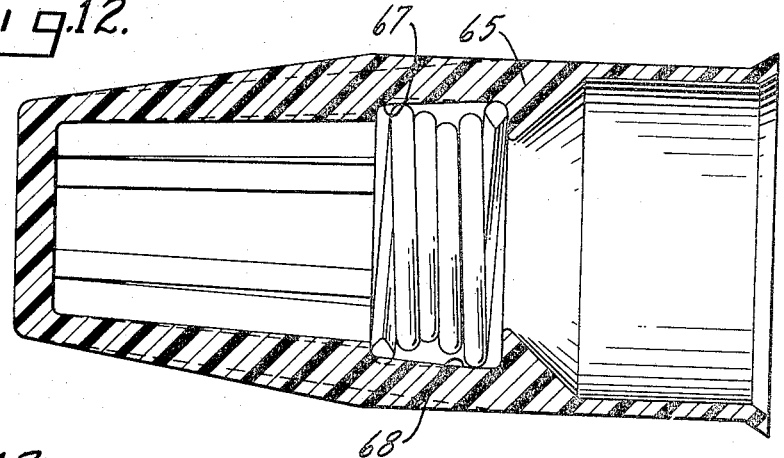
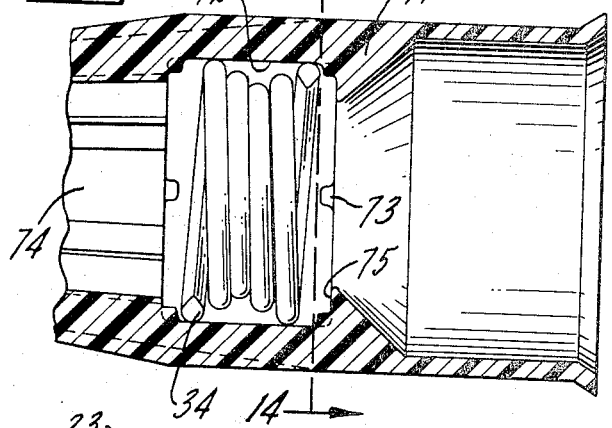 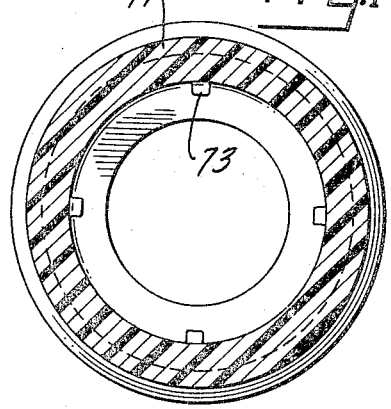
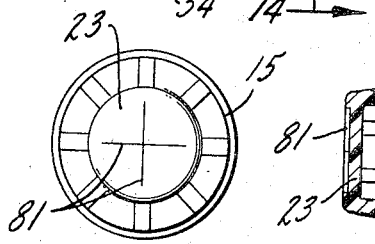 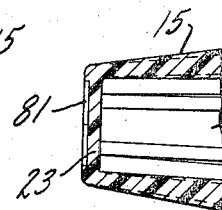 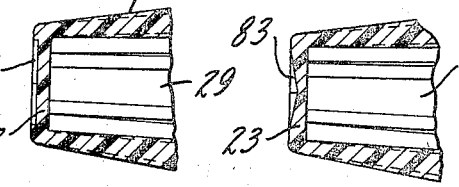 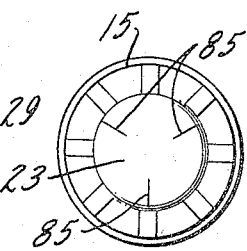
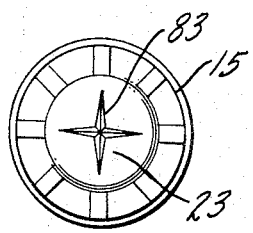 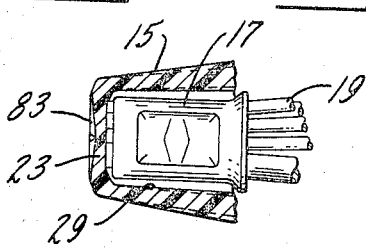
INVENTOR.
Arthur F. Swanson,
BY Parker & Carter
Attorneys.

United States Patent Office 3,350,499
Patented Oct. 31, 1967

3,350,499
INSULATED CONNECTOR
Arthur F. Swanson, De Kalb, Ill., assignor to Ideal Industries, Inc., Sycamore, Ill., a corporation of Delaware
Filed Sept. 27, 1966, Ser. No. 582,287
15 Claims. (Cl. 174—87)

ABSTRACT OF THE DISCLOSURE

A connector assembly for joining the stripped ends of insulated electrical wires including a sleeve to fit over and be fastened to the ends of the wires which sleeve has outwardly extending projections and a flexible connector cap of insulating material having a wire spring located therein. The wires and sleeve are connected to the cap by threading the outward projections of the sleeve through the wire spring located in the cap. Means to indicate when the sleeve and wires have been threaded through the wire spring is provided in the end of the cap.

This invention relates to a connector assembly for joining the stripped ends of insulated electrical wires and more particularly to such a connector assembly which locks the wires against accidental removal from the connector shell while permitting intentional removal of the wires from the connector.

An object of this invention is a connector assembly in which the joined wires must be threaded into and out of locking engagement with the connector shell.

Another object is a connector assembly utilizing a deformable sleeve adapted to fit over the ends of the wires and to cooperate with the locking means of the connector shell.

Another object is a connector assembly which resists tampering with the joined wires.

Another object is a connector assembly which requires a threading action during insertion of and removal of the wires from the connector shell.

Another object is a sleeve for a connector assembly which is adapted to receive the ends of the wires and has a portion thereof which is deformed upon crimping into spaced radially extending projections adapted to be threaded with the locking means of the connector shell.

Another object is a connector assembly in which the sleeve which fits over the ends of the wires to be connected cannot be moved into locking engagement with the connector shell until it is deformed by crimping.

Another object is a connector assembly utilizing a wire spring seated in an annular channel formed in the bore of the connector shell as a locking means.

Another object is a connector assembly in which the locking means is a double conical helical wire spring.

Another object is a connector assembly having means to indicate when the wires are fully inserted in the connector shell.

Other objects may be found in the following specification, claims and drawings.

The invention is illustrated more or less diagrammatically in the following drawings wherein:

FIGURE 1 is a plan view of the connector assembly showing the connector shell and wires before insertion of the wires into the shell;

FIGURE 2 is a longitudinal cross-sectional view through the connector shell of FIGURE 1;

FIGURE 3 is an end elevational view of a sleeve of the type shown in FIGURE 1, before crimping;

FIGURE 4 is a cross-sectional view through a crimped portion of the sleeve of FIGURE 1 with wires not shown for clarity;

FIGURE 5 is an enlarged longitudinal cross-sectional view of the connector shell showing the sleeve and wires being inserted through the locking means and showing the fully connected position of the sleeve in phantom;

FIGURE 6 is a view taken along lines 6—6 of FIGURE 5 with the wires and sleeve omitted for clarity;

FIGURE 7 is a view taken along lines 7—7 of FIGURE 5 with the wires and sleeve omitted for clarity;

FIGURE 8 is an enlarged longitudinal cross-sectional view similar to the view of FIGURE 5 but showing a modified form of sleeve;

FIGURE 9 is an end elevational view of a sleeve of the type shown in FIGURE 8;

FIGURE 10 is an enlarged longitudinal cross-sectional view similar to the view of FIGURE 5 but showing a modified form of the connector shell;

FIGURE 11 is an enlarged longitudinal cross-sectional view similar to FIGURE 10 but showing the position of the end wall of the shell with the sleeve and wires fully inserted;

FIGURE 12 is an enlarged view similar to that of FIGURE 2 and showing another modified form of a connector shell;

FIGURE 13 is a partial enlarged longitudinal cross-sectional view of still another modified form of the connector shell;

FIGURE 14 is a view taken along line 14—14 of FIGURE 13;

FIGURE 15 is an end elevational view of a connector shell having a modified end wall;

FIGURE 16 is a partial longitudinal cross-sectional view of the connector shell of FIGURE 15;

FIGURE 17 is a view similar to FIGURE 16 but showing a different modified end wall on the connector cap;

FIGURE 18 is an end elevational view of the connector cap of FIGURE 17 shown in its expanded condition;

FIGURE 19 is a partial longitudinal cross-sectional view of the connector cap of FIGURE 18 showing the sleeve and wires fully inserted therein; and FIGURE 20 is an end elevational view of a connector shell with yet another modified end wall.

The connector assembly, as shown in FIGURE 1, includes a connector shell 15 and a shell 17 with the sleeve adapted to fit over and receive the stripped ends of insulated wires 19. The shell 15 may be molded of a plastic having high dielectric characteristics such as are exhibited by the thermoplastic materials and is formed with a central bore 21 extending therethrough. One end of the bore may be closed by a wall 23 and the other end may have an opening 25. Inwardly of the opening 25, the bore is tapered at 27 to a throat 28 of reduced cross-section. A portion 29 of the bore located inwardly of the throat is formed with a cross-section larger than that of the throat but smaller than that of the main portion of the bore 21. An annular channel or groove 31 is formed in the portion 29 of the bore. A plurality of longitudinally extending, inwardly projecting and circumferentially spaced ribs 33 are formed in the annular channel 31.

A symmetrical double conical helical wire spring 34 is seated in the annular channel 31. The spring is formed with a throat 35 of minimum diameter located intermediate the ends thereof. The wire of this spring may have a generally sector shaped or teardrop cross-section with the peak 36 of the sector or teardrop pointing inwardly towards the longitudinal axis of the spring. The wire of the spring provides helical guiding surfaces 37 for threading movement of the sleeve and wires therethrough both into and out of locking engagement. The ends 38 of the spring are adapted to engage the ribs 33 of the channel 31 to retard rotation of the spring in the channel. A plurality of longitudinally extending, inwardly projecting and circumferentially spaced ribs 39 are formed in the portion 29 of the bore 21 between the channel 31 and the end wall 23. The spring is restrained against movement towards the end wall 23 of the shell by engagement with the annular shoulder 40 and the ends of ribs 39 forming the rear wall of the annular channel 31. Movement of the spring towards the opening 25 of the bore is restrained by engagement with an annular shoulder 41 which defines the front wall of the annular channel 31.

The sleeve 17, which fits over the stripped ends of the insulated wires 19, is shown in FIGURE 3 as it appears before crimping and in FIGURE 4 as it appears after crimping. In these views, the wires which normally are in the sleeve when it is crimped have been deleted for clarity of illustration. The sleeve has a bell-shaped flange 43 at one end of its tube portion 44 with the flange adapted to be located inwardly of the ends of the wires when the sleeve is installed over the wires. When the sleeve is joined to the wires through the use of a conventional crimping tool, the circular cross-sections of the tube portion 44 of the sleeve and the flange 43 are distorted to generally kidney-shaped cross-sections, as shown in FIGURE 4. Crimping also creates a depression 45 in the tubular portion of the sleeve.

The bell-shaped flange 43, after crimping, is formed with three laterally extending projections 46, 47 and 49 which extend greater distances from the center of the flange than the original outer edge of the flange. The projections 46, 47 and 49 of the sleeve will now be threadable into the connector locking means 34 to engage the helical guiding surfaces 37 when the wires and sleeve are inserted in the connector shell 15. The sleeves are selected for corresponding connector shells so that, after crimping, the maximum diameter of the tube portion 44 of the sleeve is less than the minimum diameter of the throat 35 of the locking spring 34 of a particular connector shell and the laterally extending projections 46, 47 and 49 are formed so that they may be threaded into the locking spring in contact with the helical guiding surfaces 37.

A modified form of the invention is shown in FIGURES 8 and 9 in which a sleeve 51 secured to the wires 19 by a set screw 52 is utilized in place of the crimpable sleeve. The sleeve is formed with a flange 53 having lateral projections 54, 55 and 56. The diameter of the tube portion 57 of the sleeve is smaller than the diameter of the throat 35 of the spring 34 and the projections 54, 55 and 56 are sized so that they will engage with the helical guiding surfaces 37 of the spring 34 during insertion of the sleeve and wires into the bore of the connector shell.

A modified form of connector shell is shown in FIGURES 10 and 11. The modified connector shell 59 is formed with a displaceable end wall 61 which is recessed inwardly of the closed end of the shell. When the wires and sleeve are threaded through the helical spring 34 into a fully locked position, the ends of the wires 19 will displace the wall 61 through an over center position in a direction outwardly beyond the end of the shell 59, thus indicating that the sleeve and the wires are fully seated in the bore of the shell.

Another modified form of connector shell is shown in FIGURE 12. This modified connector shell 65 is formed with a plurality of longitudinally extending, inwardly projecting and circumferentially spaced ribs 67 formed in the annular channel 68. These ribs are tapered from a maximum height at the portion of the channel adjacent the closed end of the bore to zero height at the portion of the channel adjacent the open end of the bore. Yet another modified form of the connector shell is shown in FIGURE 13 in which a shell 71 is formed with radially extending ribs 73 at the ends of the annular channel or groove 72 of the bore 74. These ribs may be formed at both ends of the channel, as shown in FIGURES 13 and 14, or may be formed only at the end of the annular channel, preferably at the end adjacent the closed end of the connector shell. With a connector cap having ribs at both ends of the channel, the spring 34 may be sized so that its length is less than the spacing between the two sets of ribs. If ribs are formed only adjacent the closed end of the cap, the spring may be sized so that its length is less than the distance between the radial ribs 73 and the wall 75 at the open end of the annular channel.

A connector cap 15 having the outer surface of its end wall 23 scored by crossed incisions 81 is shown in FIGURES 15 and 16. The incisions extend for a depth less than the thickness of the end wall. A modified form of scored end wall 23 is shown in FIGURES 17, 18 and 19. There, the incisions 83 again cross, but differ from the embodiment of FIGURES 15 and 16 in that the depth of each incision varies from a maximum at the center of the end wall to a minimum, in this case zero, away from the center. In FIGURE 18, the scored end of the connector is shown in its displaced or extended position which occurs when the end wall is contacted by the sleeves and wires in the manner shown in FIGURE 19. FIGURE 20 shows another form of scoring the end walls by incisions 85. These incisions may be of uniform or variable depth.

The wire spring 34 is symmetrical so that it may be inserted by either end into the bore of a connector shell. The connector shell is heated to soften the shell so that the spring may be forced pass the throat 28 of the shell to seat in the annular channel 31.

The use, operation and function of this invention are as follows:

The connector assembly of this invention is intended to be used to connect a number of electrical wires together and is made in various sizes depending on the particular number of wires to be connected together. For any selected connector size there will be a maximum and minimum number of wires of a predetermined size that can be properly connected by it. In using a connector assembly of the type shown herein, the insulation is stripped from the ends of the wires 19 and these ends are placed along side one another. A sleeve 17 is slipped over the ends of the wires and is forced into engagement with and secured to the wires by means of a crimping tool. After the sleeve is secured to the wires, the free ends of the wires extending beyond the sleeve are cut off adjacent the end of the sleeve.

The crimping operation changes the cross-sectional shape of both the tube portion 44 of the sleeve 17 and its bell-shaped flange 43 from circular as shown in FIGURE 3 to kidney-shaped as shown in FIGURE 4 of the drawings. The kidney-shaped flange is formed with laterally extending projections 46, 47 and 49, each of which extends a greater distance from the center of the sleeve than the original outer surface of the flange extended before crimping.

With the sleeve crimped to the wires, the sleeve and wires may be inserted into the bore 21 of the connector shell 15 through the opening 25. Since the maximum diameter of the tube portion of the deformed sleeve is less than the throat diameter of the spring, the sleeve will pass through the spring until the projections 46, 47 and 49 of the kidney-shaped flange engage the helical guiding surface 37 of the wire. When this occurs, linear movement of the wires and sleeve through the spring is retarded and in order to continue movement of the wires and sleeve into the bore, it is necessary to rotate the connector shell relative to the wires and sleeve so as to engage and thread the projections 46, 47 and 49 along the helical guiding surfaces 37 of the spring 34. During the threading operation, the spring is prevented from rotation by engagement of one of the ends 38 of the spring with a rib 33 formed in the annular channel 31 in which the spring is seated. If the modified cap of FIGURE 12 is used, one of the ends 38 of the spring will contact the ribs 67 during insertion of the sleeve and wires into the connector shell 65 to prevent rotation of the spring relative to the connector shell. When the connector shell 71 of FIGURE 13 is used, one of the ends 38 of the spring will engage the radial ribs 73 during threading of the wires and sleeve to prevent rotation of the spring relative to the connector shell. In all of the modifications, the ribs function in essentially the same manner to prevent rotation of the spring during threading and unthreading operations, except that in the modification of FIGURE 12 and, if desired, in the modification of FIGURE 13, by elimination of the ribs adjacent the open end of the connector shell, the spring will rotate during unthreading of the wires and sleeve to retard removal of the sleeve and wires from the connector. This will also reduce the possibility of accidental disengagement of the sleeve and wires from the connector shell due to vibration.

To engage the projections 46, 47 and 49 of the flange with the guiding surfaces 37 of the spring, it is necessary to impart both linear and rotational relative movement to the wires, sleeve and connector shell. When the projections of the flange have been threaded through the spring, the sleeve and wires will be positioned in the portion 29 of the bore as shown in phantom in FIGURE 5. With the sleeve and wires in the portion 29 of the bore, they cannot be removed by mere linear movement towards the opening 25 because the projections 46, 47 and 49 of the flange of the sleeve will engage the helical guiding surfaces of the spring.

To remove the sleeve and wires from the connector shell 15, it is necessary to move the sleeve and wires outwardly relative to the connector shell to engage the projections of the flange of the sleeve with the helical guiding surfaces of the spring and also to rotate the sleeve, wires and connector shell relative to one another to unthread the sleeve through the spring. Thus, the spring acts as a locking means which will permit engagement and disengagement of the sleeve and wires with the connector shell if both linear and rotational motions are imparted to these members, but will prevent engagement and separation of the wires, sleeve and connector shell by linear movement only. Thus, this construction makes the connector resistant to tampering.

The modified form of the invention shown in FIGURE 12 is also highly resistant to tampering and accidental disengagement of the wires and sleeve from the connector cap due to vibration. The spring 34 is free to rotate in a counter-clockwise direction relative to connector shell 65, as viewed from the open end of the connector shell, due to the lack of a rib 67 in the annular channel 68 adjacent the open end of the connector shell. Thus, it will be extremely difficult to engage the projections 46, 47 and 49 of the sleeve flange with the guiding surfaces 37 of the spring for unthreading of the sleeve and wires through the spring. A similar result is obtained with the modified construction shown in FIGURE 13 by eliminating the radial ribs 73 located adjacent the open end of the connector shell. For similar reasons, the spring 34 will rotate upon an attempt to thread the sleeve and wires into the spring for removal. Therefore, accidental removal due to vibration and intentional tampering will be prevented. To also reduce the possibility of accidental disengagement of the sleeve, wires and connector shell due to threading action through the spring by vibration, the length of the spring is made shorter than the distance between the sets of ribs 71 so that it is necessary to forcibly seat the sleeve against the spring before the spring, sleeve and wires can be threaded or unthreaded.

The modified form of the sleeve shown in FIGURES 8 and 9 has a flange 53 with projections 54, 55 and 56 which will engage the guiding surfaces 37 of the spring 34 to permit the sleeve to be threaded into and unthreaded from locking engagement with the connector shell. In this modified form, the sleeve 51 is attached to wires, not by crimping, but by a set screw 52 which may be screwed into contact with the wires after the sleeve is slipped over the wires.

With the modified form of the connector shell 59, shown in FIGURES 10 and 11, movement of the sleeve and wires inwardly of the locking spring is indicated by outward displacement of the end wall 61. The displacement of the end wall is accomplished by engagement of the end wall with the sleeve and end of the wires 19. A shell of this type may be used equally well with either a crimp type or set screw type sleeve.

Other forms of indicating caps are shown in FIGURES 15 through 20. When the wires and sleeve contact the end wall of the connector cap, as shown in FIGURE 19, the end wall is displaced, spreading the openings made by the incisions 83 in the outer surface of the end wall. The spreading of the incisions indicates that the end wall has been displaced by the wires and sleeve. The visibility of the spread incisions may be increased by coating the connector shell, or at least end wall thereof, with a material of a different color than that of the body of the connector shell and by extending the incisions through the coating. Thus, when the incisions are spread due to displacement of the end wall, the contrasting colors of the coating and the connector shell may be readily seen. The incisions may be made in any desirable form in the end wall of the shell. Some of the preferred configurations are shown in the drawings, although the invention should not be limited to any of these preferred forms.

While a preferred form and several variations of the invention have been described herein, it should be understood that suitable other additions, alterations and variations may be made without departing from the invention's fundamental theme. The scope of the invention should be limited only by the claims appended hereto:

I claim:

1. A connector for receiving and covering the ends of a plurality of electrical wires held together by a sleeve having laterally projecting means, said connector including:

a shell of flexible insulating material having a generally central bore open at one end and enclosed at the other end by a wall, a wire coil positioned in said bore and spaced from the ends of the bore with said wire coil secured against longitudinal movement in the bore, said wire coil having a minimum inner diameter larger than said sleeve but smaller than said laterally projecting means to permit said sleeve and wires to be threaded through said wire coil by engagement of said laterally projecting means and said wire and to prevent said sleeve and wires from being moved through said wire coil without threading, and means formed as part of said shell to limit rotation of said wire coil in at least one direction to permit said sleeve and wires to be threaded through said wire coil into said shell, said spacing between the wire coil and the end wall of the shell being sufficient to permit said sleeve to be positioned in said bore inwardly of said wire coil.

2. The structure of claim 1 further characterized in that means are formed as part of said shell to limit rotation of said wire coil to permit the sleeve and wires to be threaded through said wire coil both into and out of said shell.

3. The structure of claim 2 further characterized in that said means formed as part of said shell to limit rotation of said wire coil include longitudinally and inwardly extending ribs formed in said shell.

4. The structure of claim 1 further characterized in that said wall closing one end of said bore is recessed from said end of said shell and is displaceable towards the end of said shell upon engagement by wires inserted in said bore and threaded through said wire coil.

5. The structure of claim 1 further characterized in that said wire coil is in the form of a double conical helical spring with the portion of minimum diameter located intermediate the ends.

6. The structure of claim 1 further characterized in that the cross-section of the wire coil is sector-shaped with the peak of said sector facing inwardly towards the axis of the coil.

7. The structure of claim 1 further characterized in that incisions are provided in the outer surface of said end wall to permit spreading of adjacent portions of said end wall upon contact by wires inserted in said bore and threaded through said wire coil.

8. A connection for joining the stripped ends of insulated electrical wires including a shell of flexible insulating material having a central bore extending therethrough enclosed by a wall at one end thereof,
    a wire coil positioned in said bore and spaced from the ends of said bore with said wire coil secured against longitudinal movement in the bore,
    a sleeve surrounding the stripped ends of said wires and secured thereto and having a plurality of circumferentially spaced projections extending outwardly of the periphery of the sleeve,
    said wire coil having a minimum inner diameter larger than said sleeve but smaller than said laterally projecting means, and
    means formed as part of said shell to limit rotation of said wire coil in at least one direction,
    said projections of said sleeve being threaded through said wire coil connecting said wires with said cap with the sleeve positioned in said bore inwardly of said wire coil.

9. The structure of claim 8 further characterized in that said plurality of circumferentially spaced outwardly extending projections of said sleeve are part of a kidney-shaped flange formed on said sleeve.

10. The structure of claim 8 further characterized in that means are formed as part of said shell to limit rotation of said wire coil to permit the sleeve and wires to be threaded through said wire coil both into and out of said shell.

11. The structure of claim 10 further characterized in that said means formed as part of said shell to limit rotation of said wire coil includes longitudinally and inwardly extending ribs formed in said shell.

12. The structure of claim 8 further characterized in that said wall closing one end of said bore is recessed from said end of said shell and is displaceable towards the end of said shell upon engagement by wires inserted in said bore and threaded through said wire coil.

13. The structure of claim 8 further characterized in that said wire coil is in the form of a double conical helical spring with the portion of minimum diameter located intermediate the ends.

14. The structure of claim 8 further characterized in that the cross-section of the wire coil is sector-shaped with the peak of said sector facing inwardly towards the axis of the coil.

15. The structure of claim 8 further characterized in that incisions are provided in the outer surface of said end wall to permit spreading of adjacent portions of said end wall upon contact by wires inserted in said bore and threaded through said wire coil.

References Cited

UNITED STATES PATENTS

| | | | |
|---|---|---|---|
| 2,583,479 | 5/1926 | Marr | 174—87 |
| 2,589,368 | 3/1952 | Graham et al. | 174—87 |
| 2,715,654 | 8/1955 | Lucas | 174—77.1 |
| 2,748,186 | 5/1956 | Lee | 174—87 |
| 3,113,553 | 12/1963 | Schinske | 174—87 XR |
| 3,156,761 | 11/1964 | Schinske | 174—87 |

DARRELL L. CLAY, *Primary Examiner.*